N. M. HOLLENBECK.
DEVICE FOR DETACHING HORSES.
APPLICATION FILED NOV. 9, 1908.
934,171.
Patented Sept. 14, 1909.
2 SHEETS—SHEET 1.
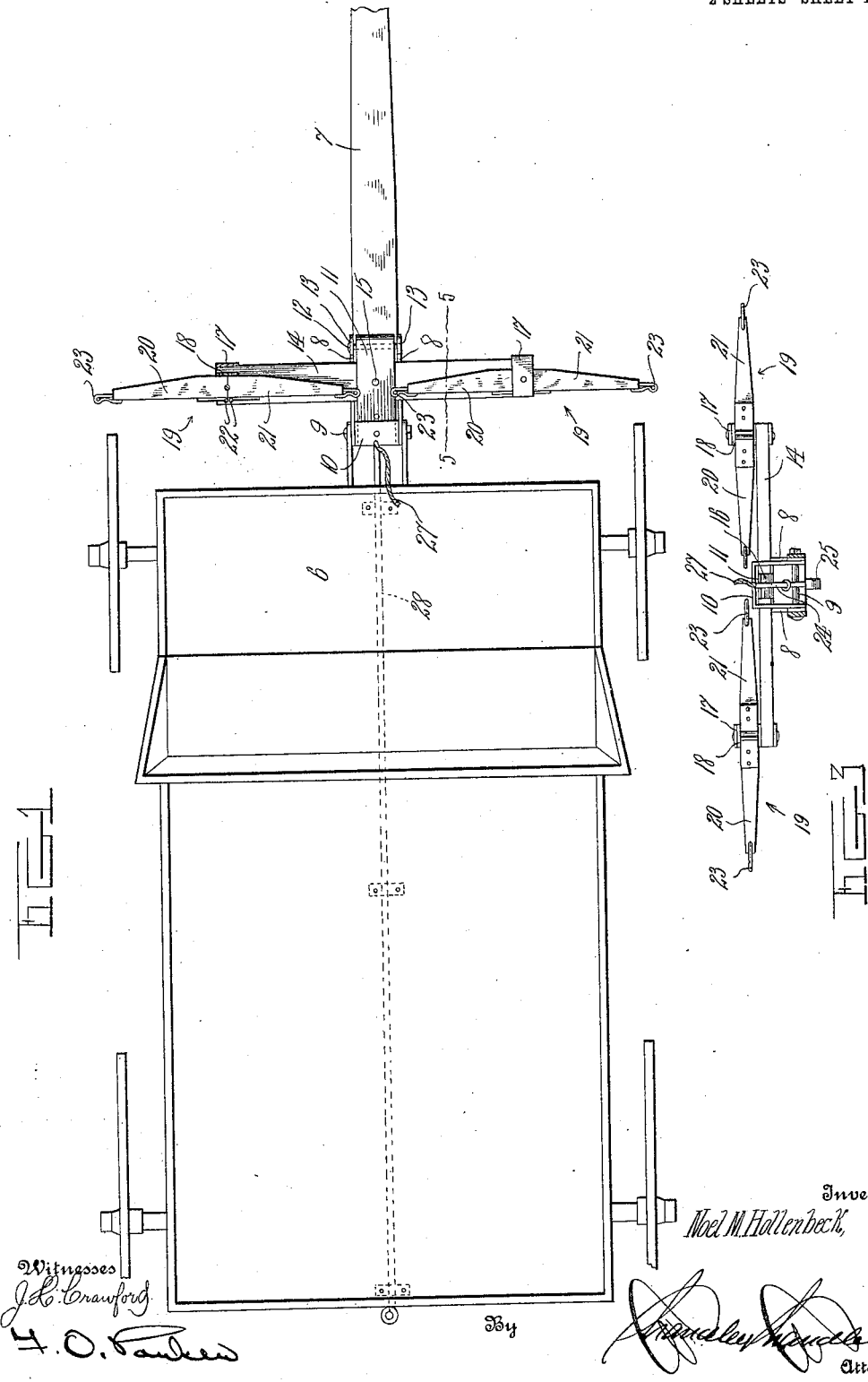

N. M. HOLLENBECK.
DEVICE FOR DETACHING HORSES.
APPLICATION FILED NOV. 9, 1908.
934,171.
Patented Sept. 14, 1909.
2 SHEETS—SHEET 2.
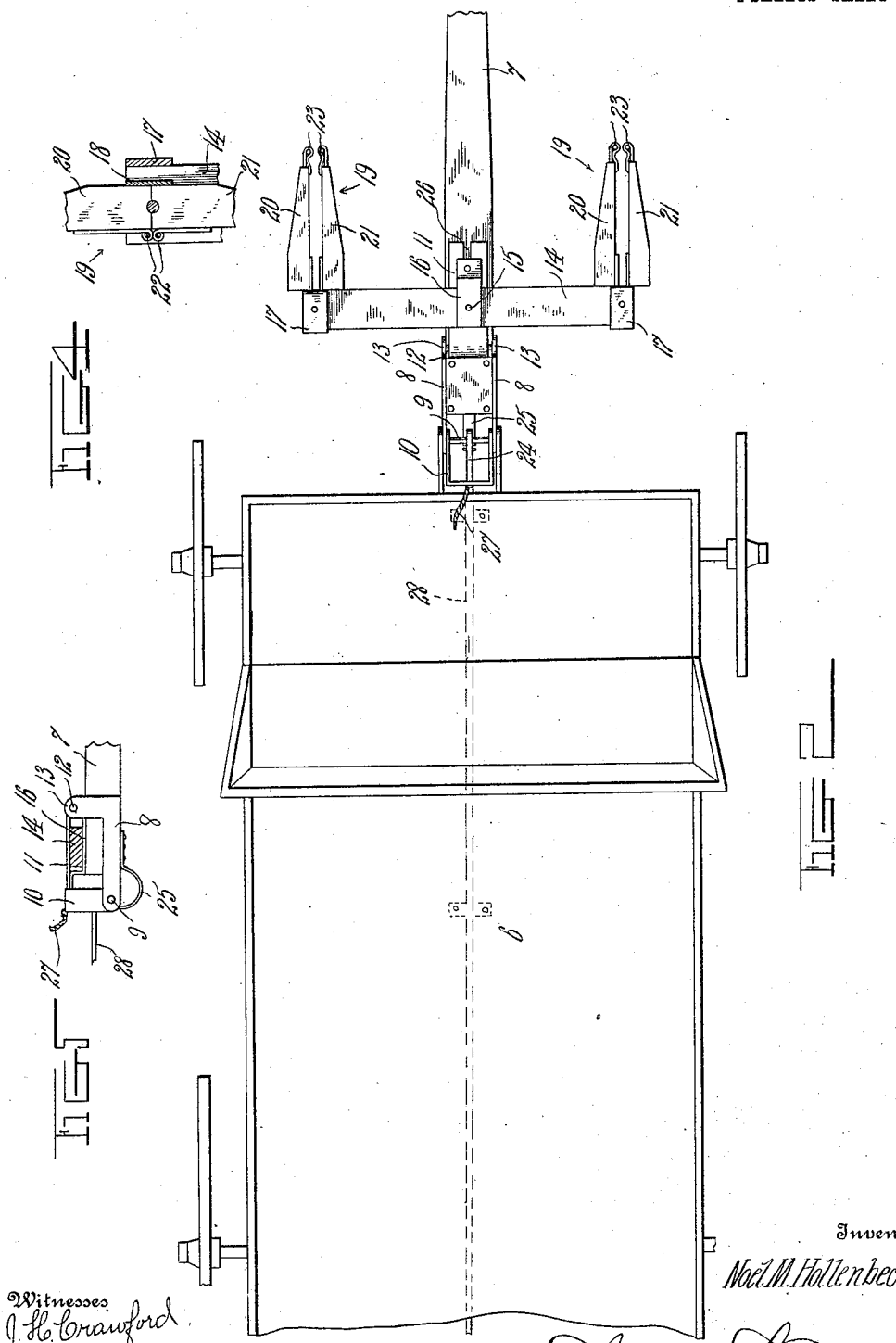
Witnesses
J. H. Crawford
F. O. Parker
Inventor
Noel M. Hollenbeck,
By
Chandlee & Chandlee
Attorneys

UNITED STATES PATENT OFFICE.

NOEL M. HOLLENBECK, OF GLENROCK, WYOMING.

DEVICE FOR DETACHING HORSES.

934,171.  Specification of Letters Patent.  Patented Sept. 14, 1909.

Application filed November 9, 1908. Serial No. 461,786.

*To all whom it may concern:*

Be it known that I, NOEL M. HOLLENBECK, a citizen of the United States, residing at Glenrock, in the county of Converse, State of Wyoming, have invented certain new and useful Improvements in Devices for Detaching Horses; and I do hereby declare the following to be a full, clear, and exact description of the invention, such as will enable others skilled in the art to which it appertains to make and use the same.

The invention relates to a device for detaching horses and more particularly to the class of horse releasers.

The primary object of the invention is the provision of a device for detaching horses and consists in novel means for securing the doubletree to the pole or shaft of a vehicle and also in a novel construction of whiffletrees supported by the doubletree whereby when the animals become frightened and attempt to run away the teamster will have control of the said means to permit the doubletree to be turned in such a manner as to permit the traces to be automatically disconnected from the whiffletrees.

Another object of the invention is the provision of a device for detaching horses consisting in novel means for securing the doubletree to the pole or shaft, the said means adapted to be controlled by the teamster when seated in the vehicle or by a person standing on the ground whereby when the horses become unmanageable the doubletree will be turned to permit the automatic detachment or disconnection of the draft animals from the vehicle.

In the drawings accompanying and forming part of this specification is illustrated the preferred form of embodiment of the invention which to enable those skilled in the art to practice the invention, will be set forth at length in the following description while the novelty of the invention will be included in the appended claims.

In the drawings: Figure 1 is a top plan view of a vehicle with the invention applied thereto. Fig. 2 is a similar view with the doubletree in its turned position to permit the release of the draft animals. Fig. 3 is a rear end view of a draft pole or shaft with its doubletree in a normal locked position. Fig. 4 is a detail fragmentary view partly in section of the whiffletree connection with the doubletree. Fig. 5 is a sectional view on the line 5—5 of Fig. 1.

Similar reference characters indicate similar parts throughout the several views in the drawings.

In the drawings, the numeral 6 designates the wheel vehicle of the ordinary construction and having connected to its front turning axle a draft pole or shaft 7 having secured to its opposite side faces L-shaped plates 8 the same extending a distance beyond the inner end of the said pole or shaft and having pivotally connected thereto by a pin 9 an inverted U-shaped yoke or clip member 10 the latter adapted to engage the free end of a turning plate 11 the same being hinged at one end by a pin 12 between vertical ears 13 of the L-shaped plates 8, the said ears rising above the top face of the pole or shaft 7 to support the said turning plate 11 in a plane to accommodate a doubletree 14 which latter is connected centrally by a pivot 15 mounted in a bearing bracket 16 secured to the lower face of the said turning plate 11 and which pivot also engages the latter.

Mounted at opposite ends of the doubletree 14 are brackets 17 in which are pivotally mounted U-shaped yokes 18 which support whiffletrees 19 each comprising two members 20 and 21 the inner ends of which are hinged or pivoted by pintles 22 carried by the said yokes 18 and the outer ends of the members have mounted therein eyes 23 to which are connected the inner ends of traces for the attachment of draft animals.

Under normal conditions the members 20 and 21 forming the whiffletrees aline and are held in such position by the pull by the draft animals on the traces connected to the outer ends thereof. However, upon the release of the turning plate 11 the doubletree pivoted thereto will be turned over and when this is effected the members 20 and 21 of the whiffletrees 19 will be in a position to turn on their pintles 22 to cause the outer ends of the said members to move toward each other and by the turning movement of the doubletree the connected ends of the traces will become detached from the whiffletrees thereby releasing the draft animals.

Fixed centrally of the yoke 10 is a bar or pin 24 and through which latter passes the pivot pin 9, and the lower free end thereof is engaged by a bowed locking spring 25 which is secured to the under face of the pole or shaft 7 and which spring serves to hold the yoke 10 in its closed position. The said turning plate 11 at its free end is notched as at 26 to accommodate the said bar 24 when the yoke 10 is in locked engagement with the turning plate to hold the same against movement.

Connected to the yoke 10 is one end of a flexible line 27 which latter has its opposite end carried over the dash board of the vehicle 6 in easy reach of the teamster and upon pulling of the said line 27 by the teamster it will disengage the yoke 10 from the turning plate 11 thereby permitting the doubletree to turn over in a manner for the subsequent release of the draft animals.

Connected to the bar 24 is one end of a line 28 the latter extending rearwardly of the vehicle the full length of the same and terminating at the back of the vehicle 6 so that the said line can be conveniently grasped by a person standing on the ground in rear of the vehicle to actuate the yoke 10 and thereby permit the turning of the doubletree for the freeing of the draft animals. This line 28 is only brought into use when the teamster has left or been thrown from the vehicle so that any pedestrian can effect the release of the animals from the vehicle when they are in the act of running away.

What is claimed is—

1. The combination with a draft pole, of a doubletree, a turning plate pivotally connected to the pole and supporting said doubletree, a yoke member adapted to engage the turning plate to hold the same against movement, whiffletrees carried at opposite ends of the doubletree, each of said whiffletrees comprising a pair of hinged members adapted to positively release traces upon the turning over of the doubletree in one direction, and means under the control of an operator for releasing the yoke from engagement with the turning plate.

2. The combination with a draft pole, of a doubletree, a turning plate pivotally connected to the pole and supporting said doubletree, a yoke member adapted to engage the turning plate to hold the same against movement, whiffletrees carried at opposite ends of the doubletree, each of said whiffletrees comprising a pair of hinged members adapted to positively release traces upon the turning over of the doubletree in one direction, means under the control of an operator for releasing the yoke from engagement with the turning plate, and spring means acting upon said yoke to normally hold the same in its locked or released position.

In testimony whereof, I affix my signature, in presence of two witnesses.

NOEL M. HOLLENBECK.

Witnesses:
R. L. HARRISON,
EMMA L. SLAUGHTER.